United States Patent [19]

Cervantes

[11] Patent Number: 4,614,352
[45] Date of Patent: Sep. 30, 1986

[54] FOLDABLE BICYCLE CART

[76] Inventor: Moses Cervantes, 8010 Pebble Dr., New Orleans, La. 70128

[21] Appl. No.: 804,184

[22] Filed: Dec. 3, 1985

[51] Int. Cl.[4] .............................................. B62K 27/12
[52] U.S. Cl. .................................... 280/204; 280/656; 280/42
[58] Field of Search ................. 280/204, 639, 35, 652, 280/656, 42

[56] References Cited

U.S. PATENT DOCUMENTS

| | | | |
|---|---|---|---|
| 3,403,924 | 10/1968 | Oliveira | 280/656 |
| 3,459,434 | 8/1969 | Dolaney | 280/646 |
| 3,747,955 | 7/1973 | MacAlpine | 280/204 |
| 3,993,321 | 11/1976 | Cote | 280/204 |

Primary Examiner—John J. Love
Assistant Examiner—Donn McGiehan
Attorney, Agent, or Firm—Harvey B. Jacobson

[57] ABSTRACT

A central longitudinal towing tongue is provided as well as front-to-rear extending opposite side wheel support frame spaced laterally outwardly of the opposite sides of the rear end portion of said tongue. Front and rear transverse frame members extend and are pivotally connected between the front and rear ends of the wheel frames and the longitudinal mid-portion of the tongue includes a sliding pivot connection with the central portion of the front frame member wherein the tongue and front frame member are relatively oscillatable about a vertical axis and the tongue may be shifted longitudinally relative to that axis. The rear end of the tongue and the longitudinal midportion of the rear transverse frame member include coacting structure whereby the rear end of the tongue may be releasably anchored to the longitudinal midportion of the rear transverse frame member, the wheel support frames and the front and rear transverse frame members defining a parallelogram linkage and the forward end of the tongue being equipped with a hitch construction for releasable connection to the rear of a bicycle.

10 Claims, 9 Drawing Figures

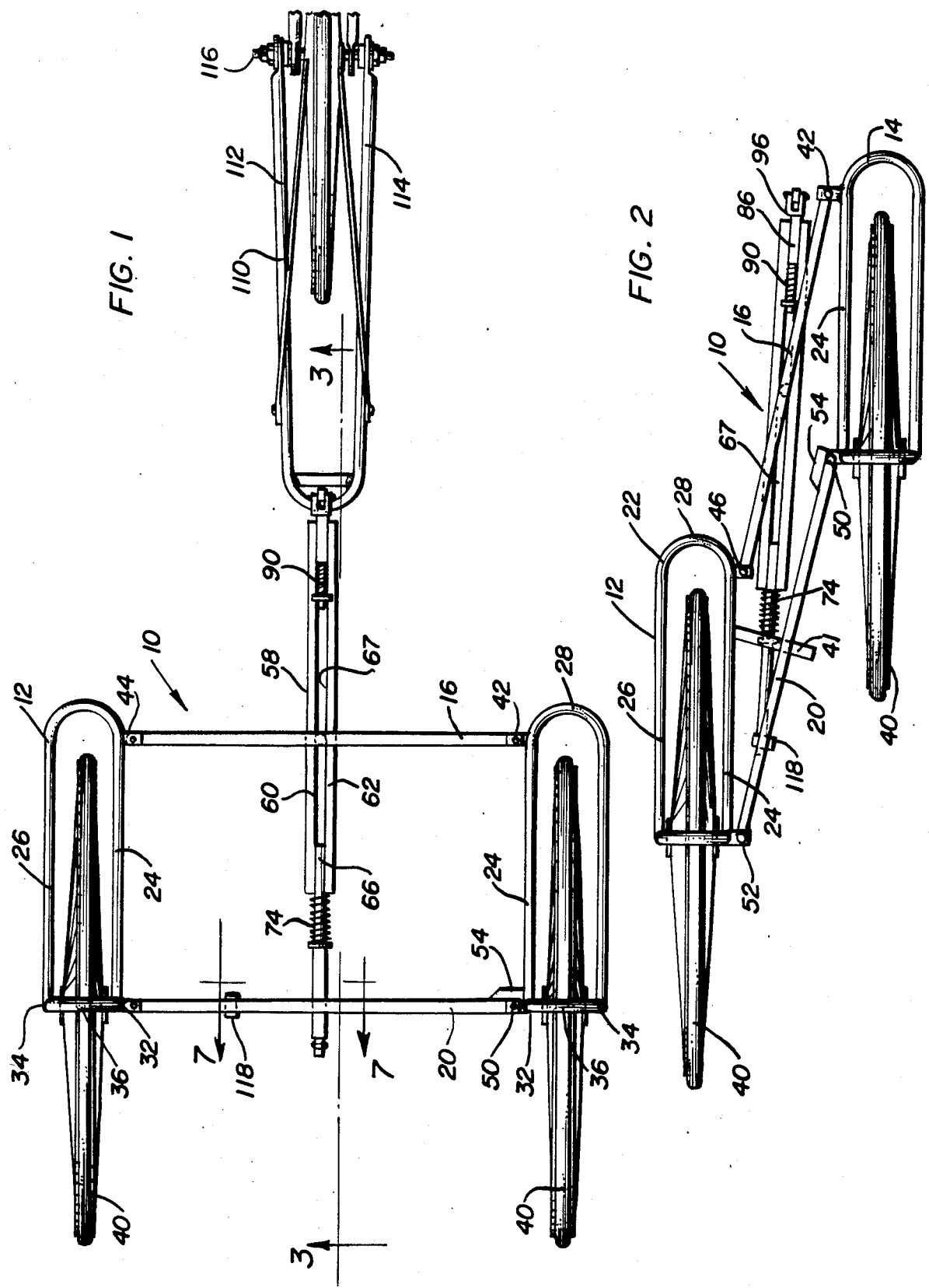

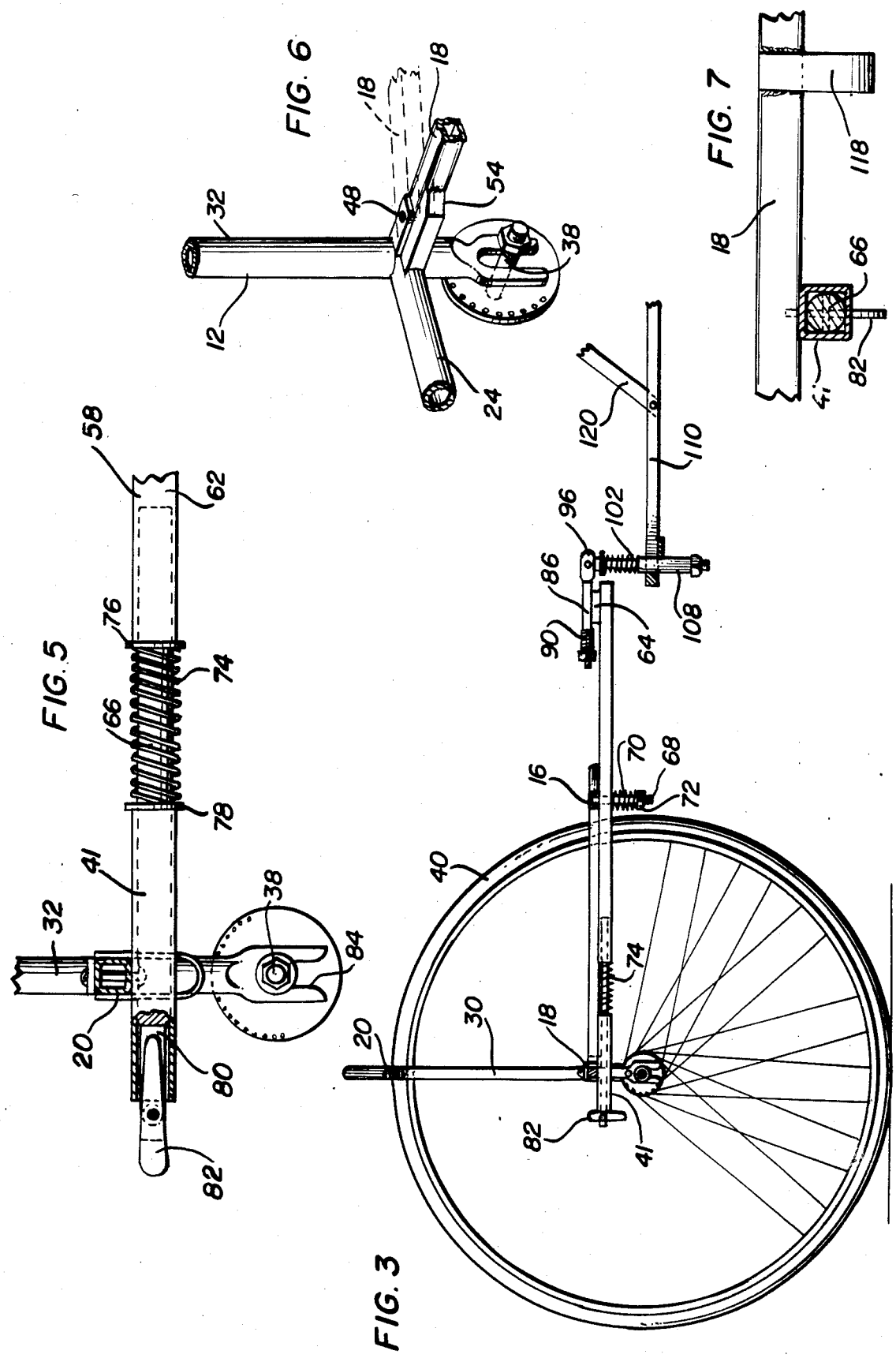

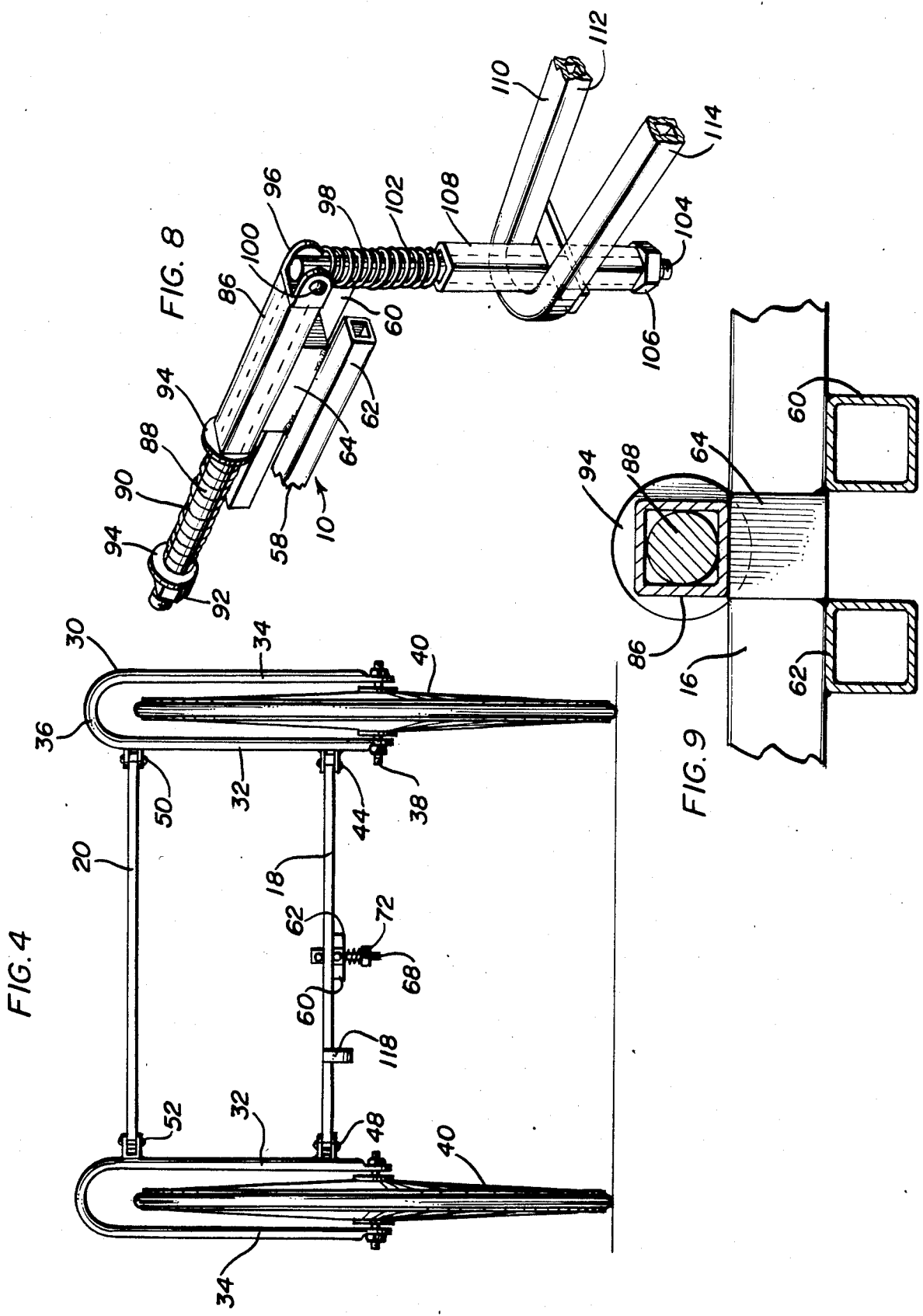

FOLDABLE BICYCLE CART

BACKGROUND OF THE INVENTION

1. Field of the Invention

This invention relates to a two-wheeled bicycle cart including a central forwardly projecting towing tongue equipped with hitch structure on its forward end for attachment to a companion hitch construction mounted from the rear of an associated bicycle frame. The cart includes opposite side wheel support frames from which the wheels of the cart are journalled and the wheel support frames are inwardly swingable (foldable) toward positions closely paralleling the towing tongue.

2. Description of Related Art

Various different forms of bicycle, carts and other similar carts heretofore have been designed to be foldable into a compact state for storage and/or transport when not being used as a cart behind a towing vehicle. However, most foldable carts include complicated structures for accomplishing the folding function thereof and various different latch structures for retaining such carts in the folded or collapsed position thereof. Accordingly, a need exists for a foldable cart utilizing simplified structure for accomplishing the folding function thereof and a single latch for retaining the cart in a folded condition.

Examples of previously known forms of carts including some of the general structural and operational features of the instant invention are disclosed in U.S. Pat. Nos. 559,761, 3,787,065, 3,792,875, 3,999,777, 4,171,139, 4,339,141 and 4,381,117.

SUMMARY OF THE INVENTION

The bicycle cart of the instant invention is constructed primarily of lightweight tubular stock and utilizes relatively pivotally connected components which together define a two-wheeled cart which is of very light construction, readily foldable into a compact state for storage and/or transport and whose pivotally connected components provide a cart capable of supporting a considerable amount of weight.

The main object of this invention is to provide a two-wheeled bicycle cart for towing behind a bicycle and which will be of lightweight construction, capable of being folded into a compact state and capable of supporting reasonably heavy loads.

Another object of this invention is to provide a bicycle cart (trailer) equipped with an improved hitch structure for ready attachment to a companion hitch to be mounted from the rear frame portion of an associated bicycle.

Yet another object of this invention is to provide a bicycle cart of the foldable type and including novel latch structure which may be readily actuated to latch the cart in an open fully operable position against folding toward the folded position.

Another important object of this invention is to provide a foldable bicycle cart with a forward hitch construction incorporating features allowing pitch, roll and turning movements between the trailer and an associated bicycle.

A final object of this invention to be specifically enumerated herein is to provide a foldable bicycle cart in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, whrein like numerals refer to like parts throughout.

BRIEF DESCRIPTION OF THE DRAWINGS

FIG. 1 is a top plan view of the bicycle cart of the instant invention in an open operative position and coupled to a towing frame carried by the rear of an associated bicycle, all but the rear frame portion and rear wheel of the associated bicycle being broken away;

FIG. 2 is a top plan view of the bicycle cart in a folded condition;

FIG. 3 is a fragmentary longitudinal vertical sectional view taken substantially upon the plane indicated by the section line 3—3 of FIG. 1;

FIG. 4 is a rear elevational view of the cart;

FIG. 5 is an enlarged fragmentary longitudinal vertical sectional view illustrating the manner in which the rear portion of the towing tongue may be released from the latching sleeve carried by the rear lower transverse brace of the cart;

FIG. 6 is a fragmentary perspective view illustrating the manner in which the right-hand end of the rear transverse brace is equipped with an abutment block to define a limit stop engageable with the right wheel support frame limiting pivotal movement of the cart toward an open operational position;

FIG. 7 is an enlarged fragmentary transverse vertical sectional view taken substantially upon the plane indicated by the sectional line 7—7 of FIG. 1;

FIG. 8 is an fragmentary perspective view illustrating the forward hitch construction of the cart in operative association with an attendant hitch to be mounted from the rear of an associated bicycle; and FIG. 9 is an enlarged fragmentary transverse vertical sectional view taken substantially upon a plane passing through the roll movement permitting portion of the hitch construction.

DESCRIPTION OF THE PREFERRED EMBODIMENT

Referring now more specifically to the drawings, the numeral 10 generally designates the bicycle cart of the instant invention. The cart 10 includes a pair of opposite side wheel supporting frames 12 and 14, front and rear lower transverse brace members 16 and 18 extending between the front and rear ends of the frames 12 and 14 and an upper transverse rear brace member 20 extending between rear upper portions of the frames 12 and 14.

Each of the wheel supporting frames 12 and 14 includes a rearwardly opening generally horizontal U-shaped frame 22 including opposite side inner and outer parallel legs 24 and 26 interconnected at their forward ends by an integral bight portion 28 and an inverted U-shaped frame 30 including inner and outer legs 32 and 34 interconnected at their upper ends by an integral bight portion 36. The free ends of the legs 24 and 34 as well as the free ends of the legs 26, 32 of each frame 12 are rigidly joined together by any suitable means such as welding and the opposite ends of a wheel axle 38 are removable mounted from and extend between the downwardly extending lower ends of the legs 32 and 34 of each of the frames 30. Each wheel axle 38 journals a wheel 40 therefrom.

The central portion of the rear transverse brace member 18 includes a front-to-rear extending tubular latch sleeve 41 supported therefrom and the opposite ends of the brace members 16 and 18 are pivotally connected as at 42 and 44 to the front and rear ends of the inner leg 24 of the frame 14 and to the front and rear ends of the inner leg 24 of the frame 12 as at 46 and 48. In addition, the opposite ends of the transverse brace member 20 are pivotally secured as at 50 and 52 to the upper ends of the inner legs 32 of the frames 30 in vertical registry with the pivot connections 44 and 48. The pivot connection at 44 includes an abutment block 54 mounted stationarily upon the transverse brace 18 and abuttingly engageable with the rear end of the inner leg 24 of the frame 12 to limit swinging movement of the frames 12 and 14 from the folded positions thereof illustrated in FIG. 2 to the open operative positions illustrated in FIG. 1.

The cart 10 also includes a central longitudinal tongue 58 including a pair of laterally spaced apart opposite side elongated members 60 and 62 interconnected at their forward ends by a closed ended tube 64, see FIG. 8, and at their rear ends by a rearwardly projecting shaft 66, the spacing between members 60 and 62 and tube 64 and shaft 66 defining a longitudinal slot 67. The longitudinal central portion of the transverse brace 16 mounts a depending shank 68 therefrom slidingly received between the members 60 and 62 and the lower end portion of the shank 68 projects below the members 60 and 62 and has a compression spring 70 mounted thereon maintained under axial compression by a nut 72 removably threaded on the lower end of the shank 68.

The shaft 66 includes a compression spring 74 mounted on the portion thereof projecting rearwardly of the members 60 and 62 and the opposite ends of the spring 74 abut against washers 76 and 78 slidable on the shaft 66. Further, the rear end of the shaft 66, disposed rearwardly of the spring 74, has a pair of rearwardly projecting transversely spaced furcations 80 thereon between which an elongated latch member 82 is pivotally mounted. The latch member and the rear end of the shaft 66, when the latch member 82 is in the horizontal position thereof illustrated in FIG. 5, are rearwardly receivable through the latch sleeve 41 to a position with the latch member 82 disposed completely rearwardly of the sleeve 41, in which position the latch member 82 may be swung to the vertical latching position thereof illustrated in FIG. 3. After the latch member 82 has been swung to the vertical position of FIG. 3, the tongue 58 may be released in order that the spring 74 may yieldingly bias the tongue 58 forwardly relative to the sleeve 41 until the vertically disposed latch member 82 abuts the rear end of the sleeve 41.

The axles 38 have their opposite ends secured through downwardly opening notches 84 formed in the lower ends of the corresponding legs 32 and 34 and the pivot connections at 42, 44, 46, 48, 50 and 52 each include quarter rounded ends of the brace members 16, 18 and 20 providing the necessary clearance for pivotal movement of the brace members 16, 18 and 20 relative to the frames 12 and 14.

With attention now invited more specifically to FIG. 8, it may be seen that a square cross-sectional horizontal sleeve 86 is mounted atop the tube 64 and rotatably and slidably receives the forward end of the cylindrical shaft 88 therethrough. The rear end of the shaft 88 projects reward of the sleeve 86 and has a compression spring 90 secured thereon by a threaded nut 92. Washers 94 are disposed between the opposite ends of the spring 90 and the sleeve 86 and nut 92 and the forward extremity of the shaft 88 has a bifurcated mount 96 thereon to which the upper end of a depending pivot shaft 98 is pivotally secured as at 100. The upper portion of the shaft 98 has a compression spring 102 mounted thereon and the lower end of the shaft 98 is externally threaded as at 104 and has a retaining nut 106 removably threaded thereon. The lower end of the shaft 98 is slidably and rotatably received through an upstanding sleeve 108 carried by the rear of a forwardly opening horizontal U-shaped hitch frame 110 including forwardly projecting opposite side arms 112 and 114 anchored to the opposite ends of the rear axle of a bicycle, motorbike or moped referred to in general, the hitch frame 110 also including opposite side forwardly and upwardly inclined braces 120 whose upper ends may be releasably anchored relative to upper opposite side portions (not shown) of the frame of the bicycle.

The lower end of the shaft 98 is retained through the sleeve 108 by the nut 106 and the spring 102 is at least slightly axially compressed as are the springs 90, 74 and 70. Thus, these compression springs maintain substantially minimum clearance connections between relatively separable components.

With attention now invited more specifically to FIG. 8 of the drawings, when it is desired to disconnect the trailer 10 from the hitch frame 110, it is merely necessary to unthread the nut 106 and to upwardly retract the lower end of the shaft 98 from the sleeve 108 and to then reapply the nut 106. Of course, the shaft 98 allows the trailer 10 to pivot about a vertical axis relative to the bicycle 118, the pivot connection 100 enables the trailer 10 to pivot about a horizontal transverse axis relative to the shaft 98 and the shaft 88 enables the trailer 10 to pivot about a horizontal axis extending longitudinally of the trailer relative to the bicycle 118.

After the trailer 10 has been disconnected from the bicycle 118, the tongue 58 may be dissplaced rearwardly relative to the transverse braces 16, 18 and 20 in order to compress the spring 74 and displace the bifurcated rear end of the shaft 66 and the latch member 82 a spaced distance rearward of the sleeve 41. Then, the latch member 82 may be swung from the vertical latched position thereof illustrated in FIG. 3 to the horizontal position illustrated in FIG. 5 and the tongue 58 may be displaced forwardly relative to the sleeve 41 in order to withdraw the furcations 80 and the latch member 82 from the forward end of the sleeve 41. Thereafter, the frames 12 and 14 may be swung relative to the transverse brace members 16, 18 and 20 to the folded positions thereof illustrated in FIG. 2 and the rear end of the shaft 66 may be inserted rearwardly through a yoke 118 carried by the transverse brace member 18 and the latch member 82 again may be pivoted to the vertical position to latch the rear end of the tongue 58 relative to the yoke 118.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A foldable bicycle cart including a central longitudinal towing tongue, a pair of opposite side front-to-rear extending wheel support frames laterally spaced on opposite sides of said central tongue, front and rear transverse frame members extending between and pivotaly connected between the front and rear ends, respectively, of said wheel support frames and forming a parallel linkage with said wheel support frames, a pair of opposite side wheels journalled from said wheel support frames, a mount mounted on said rear transverse frame member centrally intermediate its opposite ends, pivot means pivotally mounting a forward portion of said tongue to said front transverse member centrally intermediate its opposite ends for oscillation of said tongue relative to said front transverse member about an upstanding axis and with said tongue being longitudinally shiftable relative to said axis, the forward end of said tongue including hitch means for hitching said tongue to a towing vehicle, the rear end of said tongue and said mount including first and second coacting anchor means, respectively, operative to releasably anchor said tongue rear end to said mount, said wheel support frames and transverse frame members, when said anchor means is released, being relatively swingable toward collapsed positions with said wheel support frames being closely laterally spaced apart on opposite sides of said tongue.

2. The cart of claim 1 wherein said rear transverse frame member includes third anchor means with which said first anchor means is releasably engageable when said wheel frames are disposed in closely laterally spaced apart relation.

3. The cart of claim 1 wherein each of said wheel support frames includes upper portion disposed above the opposite ends of said rear transverse member, and a third transverse brace member extending between and having its opposite ends pivotally anchored to said upper portions of said wheel support frames.

4. The cart of claim 1 wherein said wheel support frames include rearwardly opening generally U-shaped frame members including inner and outer legs interconnected at their forward ends by an integral bight portion, said transverse brace members being pivotally secured to and extending between the front and rear ends of said inner legs.

5. The cart of claim 4 wherein said wheel support frames also include inverted U-shaped frames each including inner and outer legs having their lower ends anchored relative to the rear ends of the inner and outer legs of the corresponding rearwardly opening U-shaped frames.

6. The cart of claim 1 including means operatively associated with at least one of said transverse frame members and one of said wheel support frames limiting swinging movement of said wheel support frames away from each other toward open operational positions.

7. The cart of claim 1 wherein said hitch means includes first horizontal shaft means oscillatably supported from the forward end of said tongue for angular displacement about its longitudinal axis and projecting forwardly of said tongue, a second shaft depending downwardly from the forward end of said first shaft and pivotally anchored to the latter for oscillation relative thereto about an axis extending transversely of said first and second shafts, the lower end of said second shaft being adapted for oscillatable support from an upstanding portion of a bicycle mounted trailer hitch.

8. The cart of claim 7 wherein said first shaft is rotatably and slidably received through a front-to-rear extending open ended sleeve mounted from the forward end of said tongue, said forward end of said first shaft including abutment means thereon abuttingly engageable with the forward end of said open ended sleeve, and spring means operatively connected between said shaft and open ended sleeve yieldingly biasing said first shaft rearwardly relative to said open ended sleeve.

9. The cart of claim 1 wherein said tongue defines a front-to-rear extending vertical slot therethrough, said pivot means including a pivot shaft carried by said front transverse frame members centrally intermediate its opposite ends rotatable and slidable in said slot and releasably secured therethrough.

10. The cart of claim 9 wherein said rear transverse frame member includes third anchor means with which said first anchor means is releasably engageable when said wheel frames are disposed in closely laterally spaced apart relation.

* * * * *